(12) United States Patent (10) Patent No.: US 11,778,080 B2
Liu et al. (45) Date of Patent: Oct. 3, 2023

(54) ELECTRONIC DEVICE WITH FLEXIBLE DISPLAY SCREEN

(71) Applicant: BEIJING XIAOMI MOBILE SOFTWARE CO., LTD., Beijing (CN)

(72) Inventors: Zhenhua Liu, Beijing (CN); Pengfei Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/557,332

(22) Filed: Dec. 21, 2021

(65) Prior Publication Data

US 2022/0417355 A1 Dec. 29, 2022

(30) Foreign Application Priority Data

Jun. 25, 2021 (CN) .......................... 202110713465.1

(51) Int. Cl.
*G06F 1/16* (2006.01)
*H04M 1/02* (2006.01)

(52) U.S. Cl.
CPC ........ *H04M 1/0268* (2013.01); *G06F 1/1652* (2013.01)

(58) Field of Classification Search
CPC .................................................. G06F 1/1652
See application file for complete search history.

(56) References Cited

U.S. PATENT DOCUMENTS 10,747,269 B1 * 8/2020 Choi ..................... G06F 1/1624
11,042,195 B1 * 6/2021 Hong .................. H04M 1/0268

| | | | |
|---|---|---|---|
| 2018/0102072 A1 * | 4/2018 | Lee | G02F 1/133305 |
| 2019/0204874 A1 * | 7/2019 | Kim | G06F 1/1643 |
| 2020/0249722 A1 * | 8/2020 | Cha | G06F 1/1681 |
| 2020/0267247 A1 * | 8/2020 | Song | H04M 1/0237 |

(Continued)

FOREIGN PATENT DOCUMENTS

CN 212992368 U * 4/2021
CN 212992368 U 4/2021

(Continued)

OTHER PUBLICATIONS

European Patent Application No. 21218159.8 extended Search and Opinion dated Aug. 29, 2022, 12 pages.

*Primary Examiner* — Rockshana D Chowdhury
(74) *Attorney, Agent, or Firm* — COZEN O'CONNOR

(57) ABSTRACT

An electronic device with a flexible display screen includes a first housing and a second housing enclosed to form a receiving structure with an opening. A sliding rail mechanism is connected to the second housing, and slidably provided on the first housing along a first direction. The flexible display screen has a first end connected with the sliding rail mechanism and a second end connected with the first housing to cover the opening. A driving mechanism is connected to the first housing, and connected to the sliding rail mechanism for driving the sliding rail mechanism to move. A control mechanism includes a displacement sensor for measuring displacement change of the sliding rail mechanism relative to the first housing; and a controller provided at the first housing and configured to control a first stroke amount that the sliding rail mechanism moves along the first direction according to the displacement change.

18 Claims, 9 Drawing Sheets

(56) References Cited

U.S. PATENT DOCUMENTS

| | | | |
|---|---|---|---|
| 2021/0120111 A1 | 4/2021 | Choi et al. | |
| 2022/0182477 A1* | 6/2022 | Kim | H04M 1/0237 |
| 2023/0095247 A1* | 3/2023 | Feng | G06F 1/1652 |
| | | | 361/679.27 |
| 2023/0156105 A1* | 5/2023 | Feng | H04M 1/0268 |
| | | | 361/679.01 |
| 2023/0195181 A1* | 6/2023 | Zheng | G06F 1/1652 |
| | | | 361/679.27 |
| 2023/0199984 A1* | 6/2023 | Jung | H04M 1/0268 |
| | | | 361/807 |
| 2023/0205351 A1* | 6/2023 | Kim | G06F 3/0416 |
| | | | 345/174 |
| 2023/0213967 A1* | 7/2023 | Kang | G06F 1/1652 |
| | | | 455/575.4 |
| 2023/0213978 A1* | 7/2023 | Kim | G06F 1/1624 |
| | | | 455/566 |

FOREIGN PATENT DOCUMENTS

| | | | | | |
|---|---|---|---|---|---|
| CN | 112991928 A | * | 6/2021 | ........... | G06F 1/1652 |
| CN | 113012569 A | * | 6/2021 | ........... | G06F 1/1624 |
| KR | 20170116551 A | | 10/2017 | | |

* cited by examiner

ELECTRONIC DEVICE WITH FLEXIBLE DISPLAY SCREEN

CROSS-REFERENCE TO RELATED APPLICATION

This application claims priority to and benefits of Chinese Patent Application Serial No. 202110713465.1, filed on Jun. 25, 2021, the entire content of which is incorporated herein by reference.

TECHNICAL FIELD

The present disclosure relates to the field of retractable screen products, and more particularly, to an electronic device with a flexible display screen.

BACKGROUND

With the continuous advancement of screen technology including large-scale production of foldable flexible screens and the advent of 0.01 mm flexible display screens all over the world, the form factors of terminal products are becoming increasingly diverse. From smart wearables to smart homes and smart phone terminals, ultra-thin flexible screens lead to multi-directional designs for future products, such as foldable mobile phones, ring mobile phones, special curved terminal products, and the like. The arrival of 5G enables all smart products to be electrically connected and the faster data transmission provided by 5G enables some modules of smart terminal products, such as camera modules, BOX acoustic modules, and the like, to be separated from smart terminal products and still achieve the same functions. With a further development of the battery technology, the size of the terminal product becomes smaller, battery capacity becomes higher, and the design form of the terminal product is more flexible.

With the increasing requirements for flexible screen products, it may be necessary to enlarge or reduce the display area when dealing with different tasks such as watching videos and making phone calls to improve the product experience. Currently, there are mainly two screen expansion structures: a foldable screen structure and a retractable screen structure.

SUMMARY

The present disclosure provides an electronic device to solve at least some of the problems in the related art.

An embodiment of the present disclosure provides an electronic device, including: a first housing and a second housing enclosed to form a receiving structure with an opening; a sliding rail mechanism provided in the receiving structure and connected to the second housing, the sliding rail mechanism being slidably provided to the first housing along a first direction; a flexible display screen provided having a first end connected with the sliding rail mechanism and a second end connected with the first housing to cover the opening; a driving mechanism provided in the receiving structure and connected to the first housing, the driving mechanism being connected to the sliding rail mechanism and configured to drive the sliding rail mechanism to move along the first direction; and a control mechanism including a displacement sensor and a controller electrically connected to the displacement sensor, the displacement sensor being configured to measure displacement change of the sliding rail mechanism relative to the first housing; the controller being provided at the first housing and configured to control, according to the displacement change, a first stroke amount that the sliding rail mechanism moves along the first direction under drive of the driving mechanism. The driving mechanism drives the sliding rail mechanism to move along the first direction, to drive the second housing and the first end of the flexible display screen to move along the first direction relative to the first housing, such that the flexible display screen is switched between a retracted state and an expanded state.

It is to be understood that both the foregoing general description and the following detailed description are exemplary and explanatory only and do not limit the present disclosure.

BRIEF DESCRIPTION OF THE DRAWINGS

The accompanying drawings, which are incorporated in this specification and constitute a part of this specification, illustrate embodiments consistent with the present disclosure and, together with the description, serve to explain the principles of the present disclosure.

DETAILED DESCRIPTION

Embodiments of the present disclosure will be described in details herein, and the examples thereof are illustrated in the accompanying drawings. When the description below concerns the drawings, same numbers in different drawings represent same or similar elements unless indicated otherwise. The implementations described in the following embodiments do not represent all embodiments consistent with the present disclosure. Instead, they are merely examples of devices and methods consistent with some aspects of the present disclosure as detailed in the appended claims.

The terms used in the present disclosure are merely for the purpose of describing specific embodiments, which are not intended to limit the present disclosure. Unless defined otherwise, the technical or scientific terminologies used in the present disclosure shall be the general meaning understood by those skilled in the related art of the present disclosure. Terms such as "first", "second" and the like used in the descriptions and claims of the present disclosure do not indicate any order, quantity or importance, but are only used to distinguish different components. Similarly, terms such as "one" or "a" do not refer to quantity limitation, but to indicate the existence of at least one. Term "a plurality" or "several" means two and more than two. Unless specified otherwise, terms such as "front portion", "rear portion", "lower portion" and/or "upper portion", and the like are merely for convenience of description, and are not limited to one position or one spatial orientation. Terms such as "comprise" or "comprising" and the like mean that the elements or objects presented before "comprise" or "comprising" contain the elements or objects presented after "comprise" or "comprising" and their equivalents, which do not exclude other elements or objects. The terms "coupled," "connected," and the like are not restricted to physical or mechanical connections, can also be electrical connections, no matter direct or indirect.

The terms used in the present disclosure are merely for the purpose of describing specific embodiments, which are not intended to limit the present disclosure. As used in the descriptions and the appended claims of the present disclosure, "a" "the" and "this" in singular forms mean including plural forms, unless clearly indicated in the context otherwise. It should also be understood that, as used herein, the term "and/or" represents and contains any and all possible combinations of one or more associated listed items.

The present disclosure provides an electronic device 100. The electronic device 100 of the present disclosure will be described in detail below with reference to the accompanying drawings. In the case of no conflict, the features in the following embodiments and implementations may be combined with each other.

Figure 1:
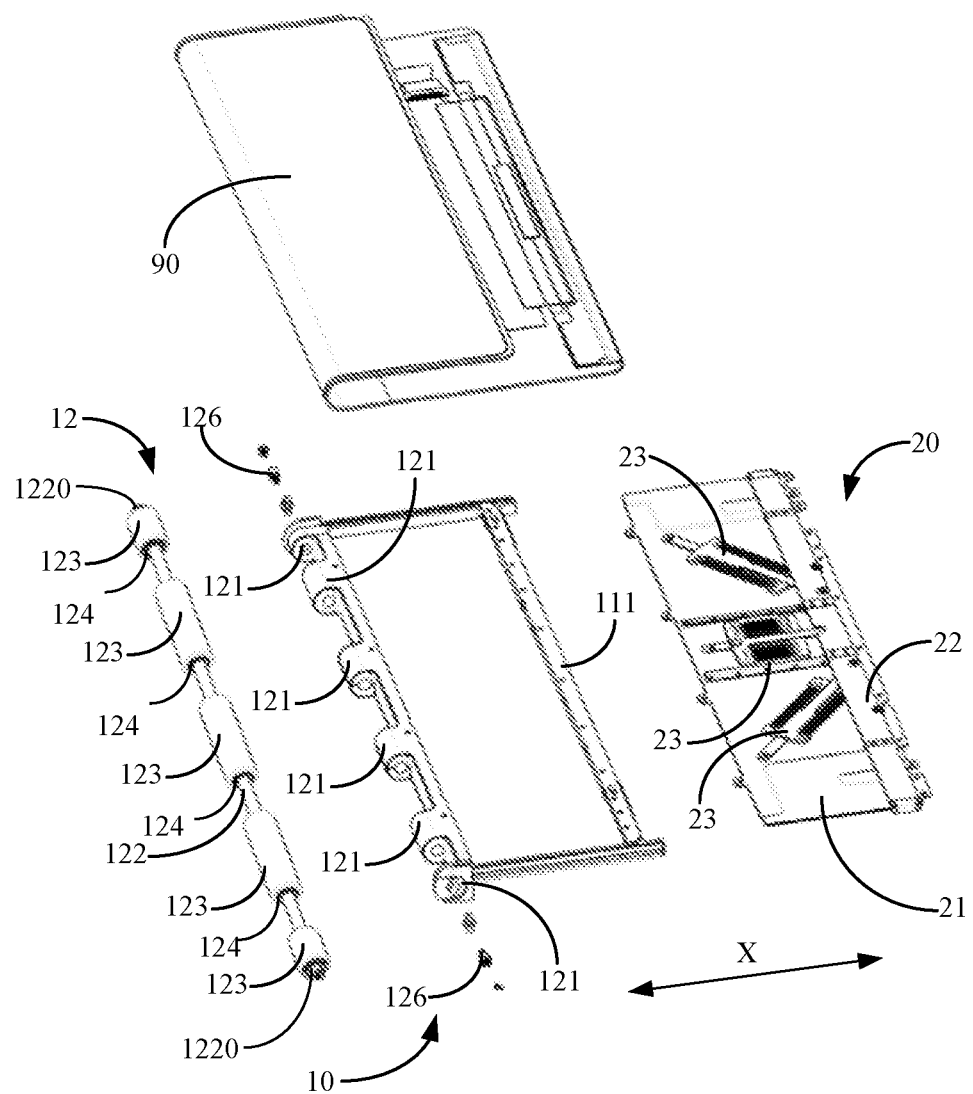
FIG. 1 is an exploded view of a retractable screen structure according to an embodiment of the present disclosure.
Figure 2:
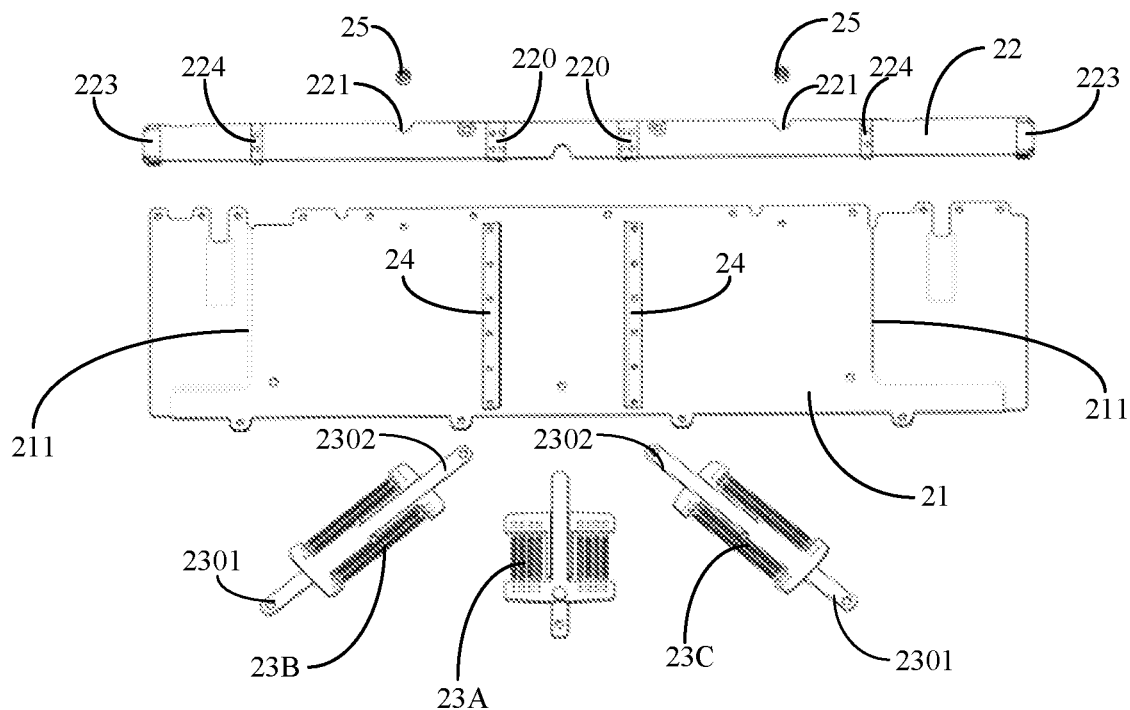
FIG. 2 is a schematic exploded view of a sliding rail assembly of a sliding rail mechanism according to an embodiment of the present disclosure.
Figure 3:
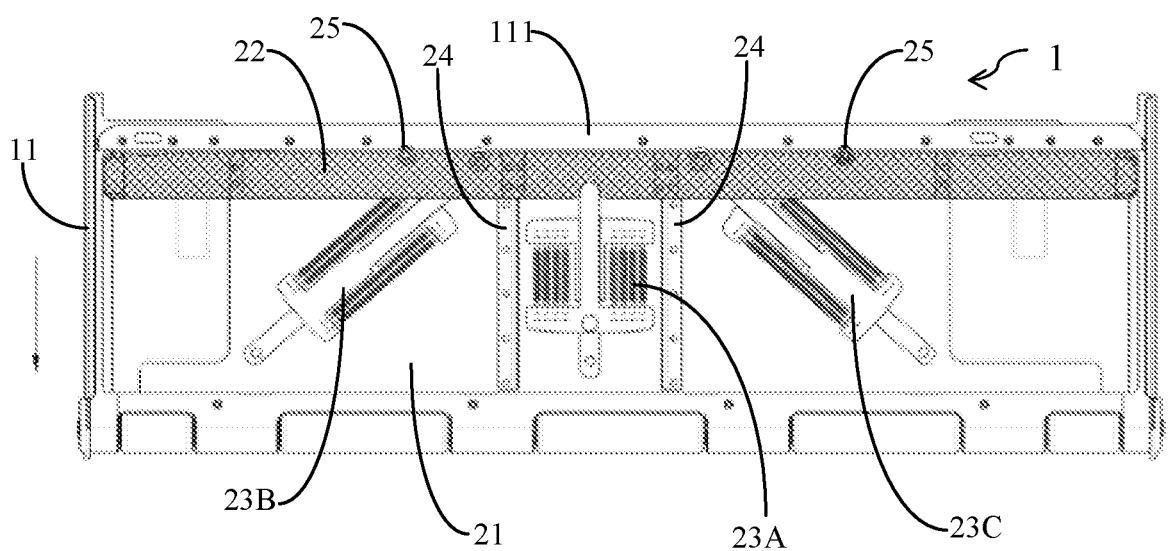
FIG. 3 is a structural view of a sliding rail mechanism according to an embodiment of the present disclosure.

Referring to FIGS. 1 to 3, an embodiment of the present disclosure provides a sliding rail mechanism 1 for a retractable screen structure, including a bracket assembly 10 and a sliding rail assembly 20. The bracket assembly 10 includes a bracket 11. The sliding rail assembly 20 includes a fixed base 21, a sliding member 22 configured to connect a flexible display screen 90 of the retractable screen structure, and an elastic assembly 23. The fixed base 21 is fixedly connected to the bracket 11, the sliding member 22 is slidably provided on the fixed base 21 along a first direction X (a vertical direction illustrated in FIG. 3), a first end 2301 of the elastic assembly 23 is connected to the fixed base 21, and a second end 2302 of the elastic assembly 23 is connected to the sliding member 22. When sliding relative to the fixed base 21 along the first direction X, the sliding member 22 drives the second end of the elastic assembly 23 and the flexible display screen 90 to move together. The elastic assembly 23 is stretched or compressed under the drive of the sliding member 22 to deform, thereby generating a pre-tension to the flexible display screen 90. It can be understood that the sliding member 22 slides relative to the fixed base 21 along a direction indicated by an arrow in FIG. 3, and then stretches the elastic assembly 23 to generate a reverse tension force.

Through the above arrangement, the sliding member 22 in the slide rail mechanism provided by the present disclosure moves along the first direction X relative to the fixed base 21, and then can drive the flexible display screen 90 of the retractable screen structure to move together, thereby achieving the expanding and retracting of the flexible display screen 90. The sliding member 22 drives the elastic assembly 23 to move together to stretch the elastic assembly 23, thereby generating a pre-tension on the flexible display screen 90. Thus, the flexible display screen 90 becomes much flatter when expanded, thereby preventing visual problems such as bulging, swelling and distortion of the screen when the whole device is slid open.

In some possible implementations, the sliding rail assembly 20 further includes at least one guide rail 24, the guide rail 24 is provided on the fixed base 21 and extends along the first direction X, the sliding member 22 defines a sliding groove 220 corresponding to the guide rail 24, and the sliding member 22 is slidably provided on the guide rail 24 through the sliding groove 220. In the present embodiment, two sets of guide rails 24 are provided and symmetrically provided on the fixed base 21, such that the sliding member 22 may slide more stably. In other examples, there may also be other numbers of guide rails 24, which is not limited in the present disclosure.

In some possible implementations, the sliding rail assembly 20 further includes at least one limit stopper 25, provided at an end of the fixed base 21 away from the bracket 11 (i.e., an upper end in FIG. 3). The sliding member 22 is provided with a limit portion 221 abutting against and cooperating with the limit stopper 25. The limit stopper 25 abuts against and cooperates with the limit portion 221 of the sliding member 22 to limit an initial position of the sliding member 22 and also prevent the sliding member 22 from separating from the guide rail 24. In the present embodiment, the limit portion 221 may be understood as a groove, two limit stoppers 25 are provided and symmetrically arranged on the fixed base 21, two limit portions 221 are provided and correspond to the limit stoppers 25, which is not limited in the present disclosure. In the example illustrated in FIG. 3, the limit stoppers 25 are provided at an upper end of the fixed base 21, and the initial position of the sliding member 22 is located at the upper end of the fixed base 21. In this state, the elastic assembly 23 applies an elastic pre-tension to the sliding member 22, to keep the sliding member 22 at the initial position.

Figure 4:
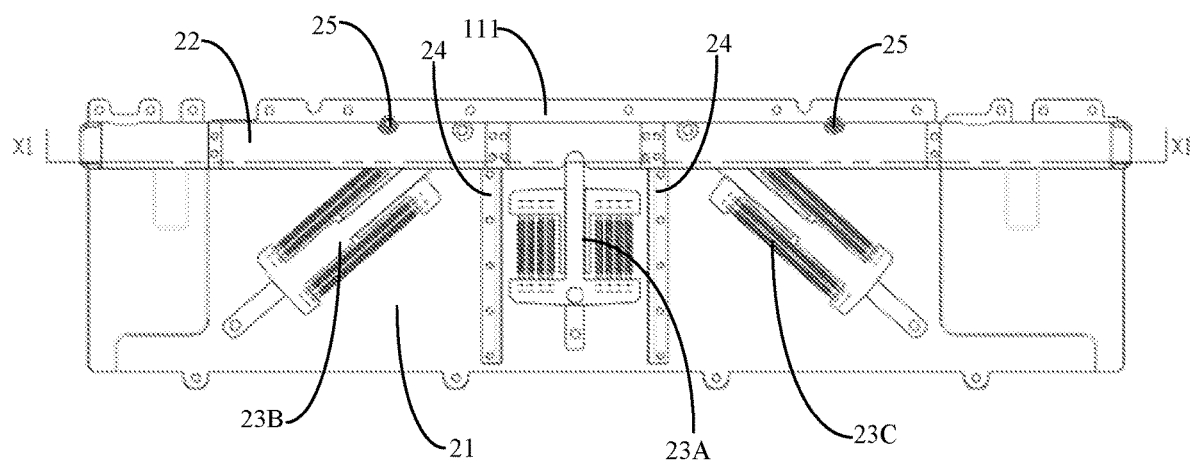
FIG. 4 is a structural view of a sliding rail assembly of a sliding rail mechanism according to an embodiment of the present disclosure.
Figure 5:
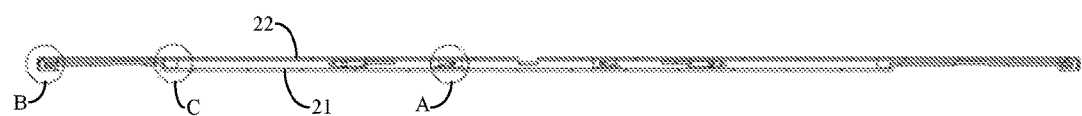
FIG. 5 is a sectional view of FIG. 4 along X1-X1 direction.
Figure 6:
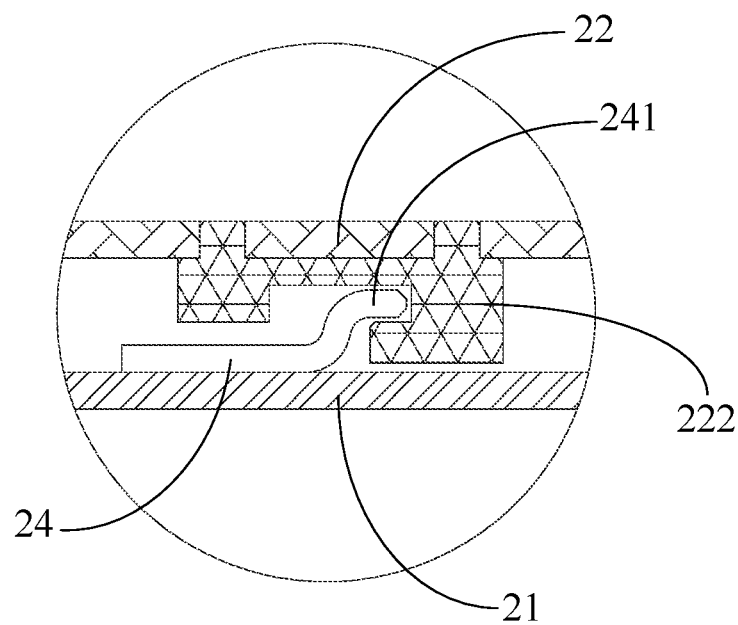
FIG. 6 is a partially enlarged view of a position A in FIG. 5.

Referring to FIGS. 4 to 6, in some possible implementations, at least one side of the guide rail 24 is provided with an engagement portion 241, and the sliding member 22 is provided with a first snap portion 222 snapped with the engagement portion 241. The sliding member 22 is snapped with the engagement portion 241 of the guide rail 24 through the first snap portion 222 to be more securely connected to the guide rail 24, such that the sliding member 22 may more stably slide along the guide rail 24. It may be understood that the engagement portion 241 may be an inverted hook structure machined from a sheet metal part, to prevent the sliding member 22 from moving away from the guide rail 24. In the present embodiment, two sides of the guide rail 24 are each provided with the engagement portion 241, which is not limited in the present disclosure.

Figure 7:
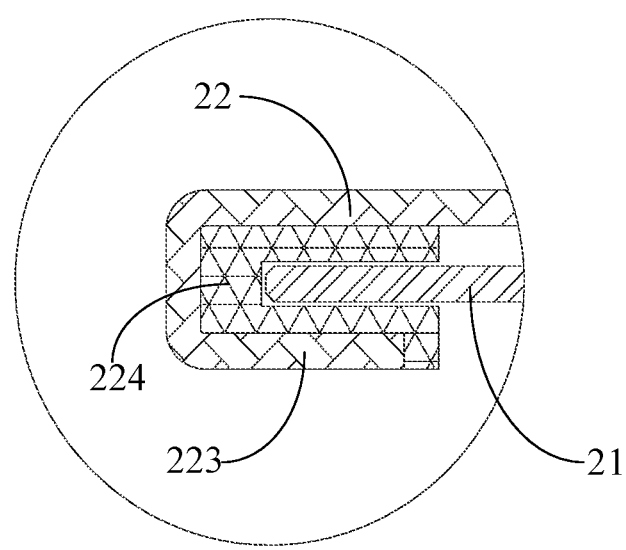
FIG. 7 is a partially enlarged view of a position B in FIG. 5.

Referring to FIG. 7, in some possible implementations, the side of the sliding member 22 is provided with a second snap portion 223 snapped with a side edge of the fixed base 21. The sliding member 22 is snapped with the side edge of the fixed base 21 through the second snap portion 223, such that the sliding member 22 and the fixed base 21 are connected more stably and the sliding member 22 is prevented from separating from the fixed base 21 when sliding, thus improving the sliding stability of the sliding member 22. Further, the sliding rail assembly 20 further includes a plastic snap 224, covering and snapped with the side edge of the fixed base 21, and the second snap portion 223 is snapped to the plastic snap 224. The plastic snap 224 can reduce friction between the second snap portion 223 and the side edge of the fixed base 21, reduce wear and ensure smooth sliding. In the present embodiment, the plastic snap 224 may be made of POM (Polyoxymethylene) plastic which is a self-lubricating plastic. The sliding member 22 and the plastic snap 224 may be combined as one part by an insert-molding process. A design gap between the plastic snap 224 and the side edge of the fixed base 21 is 0.05, to ensure that the sliding member 22 may only slide along an extending direction of the guide rail 24, i.e., the first direction X, thus improving the structural stability.

Figure 8:
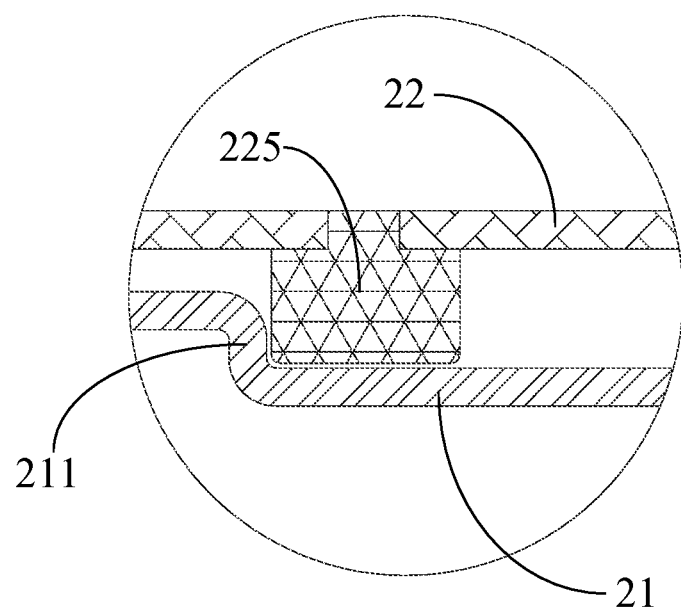
FIG. 8 is a partially enlarged view of a position C in FIG. 5.

Referring to FIG. 8, in some possible implementations, the fixed base 21 is provided with a step portion 211 extending along the first direction X, and the sliding member 22 is provided with an abutting block 225 abutting against the step portion 211. Through cooperation between the abutting block 225 and the step portion 211, the sliding member 22 may be further prevented from separating from the fixed base 21 when sliding.

Figure 9:
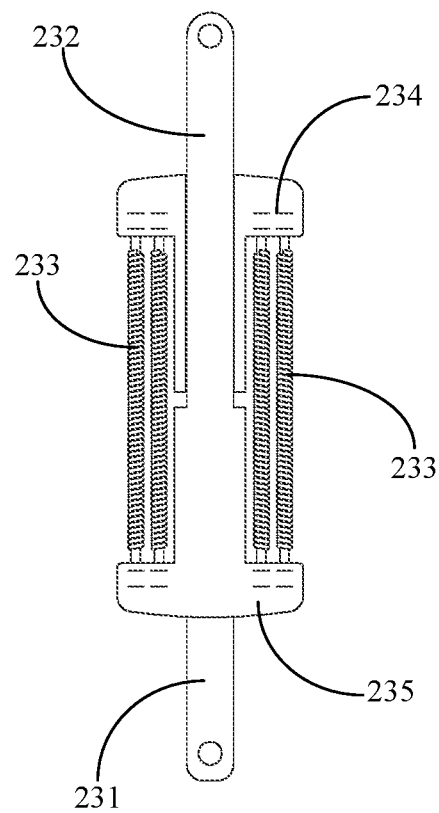
FIG. 9 is a structural view of an elastic assembly of a sliding rail mechanism according to an embodiment of the present disclosure.

Referring to FIG. 9, in some possible implementations, the elastic assembly 23 includes a first rod 231, a second rod 232, and an elastic member 233. The first rod 231 and the second rod 232 are inserted into each other and slidable relative to each other, and the elastic member 233 is connected between the first rod 231 and the second rod 232. The first rod 231 is connected to the fixed base 21, and the second rod 232 is connected to the sliding member 22. The elastic member 233 may be a spring, a tension spring, or the like, and has a pre-tension during assembly to keep the sliding member 22 at the initial position. When the first rod 231 and the second rod 232 are stretched, the spring starts to work. When sliding relative to the fixed base 21, the sliding member 22 drives the second rod 232 to slide relative to the first rod 231 and cooperates with the first rod 231 to stretch or compress the elastic member 233, such that the elastic member 233 is deformed to generate an elastic force to the sliding member 22.

Further, the first rod 231 and the second rod 232 each define a sliding groove, and the first rod 231 and the second rod 232 are inserted into each other and slidable relative to each other. A first end (a lower end illustrated in FIG. 9) of the first rod 231 is fixed to the fixed base 21 by a rivet, and a first end (an upper end illustrated in FIG. 9) of the second rod 232 is fixed to the sliding member 22 by a rivet, a second end of the first rod 231 protrudes outward to form a first protrusion 234, and a second end of the second rod 232 protrudes outward to form a second protrusion 235; there are a plurality of elastic members 233 evenly arranged between the first protrusion 234 and the second protrusion 235, which may provide sufficient elastic force. When sliding relative to the fixed base 21, the sliding member 22 drives the second rod 232 to slide relative to the first rod 231 and cooperates with the first rod 231 to stretch the elastic member 233, such that the elastic member 233 is deformed to generate a reverse tension on the sliding member 22, thus ensuring that the flexible display screen is in a "tightened" state.

In some possible implementations, there are a plurality of the elastic assemblies 23, including a first elastic assembly 23A, a second elastic assembly 23B, and a third elastic assembly 23C. The second elastic assembly 23B and the third elastic assembly 23C are symmetrically provided on two sides of the first elastic assembly 23A. The elastic member 233 of the first elastic assembly 23A extends along the first direction X, and the elastic members 233 of the second elastic assembly 23B and the third elastic assembly 23C are symmetrically provided along the first direction X and inclined with respect to the first direction X.

Due to limited space, it is difficult for a single guide rail to achieve such a large elastic stroke. Based on the above arrangement, the three elastic assemblies may form a relay form to increase the sliding stroke of the elastic assemblies. The second elastic assembly 23B and the third elastic assembly 23C are in the same design and are arranged symmetrically on two sides of the elastic assembly 23A. An initial compression amount of the elastic member of the first elastic assembly 23A may be slightly greater than initial compression amounts of the elastic members of the second elastic assembly 23B and the third elastic assembly 23C, thereby achieving a greater sliding stroke. Assuming that the designed total sliding stroke is 30.00 mm, the first elastic assembly 23A may start working after the sliding member 22 slides 19 mm.

In some possible embodiments, the sliding rail assembly 20 as a whole may be fixed to the bracket 11 by riveting. An end of the bracket 11 may include a connecting plate 111, and the fixed base 21 may be a stamped metal plate and fixed to the connecting plate 111 through a riveting process. The flexible display screen 90 is fixed to the sliding member 22 of the sliding rail assembly 20. The bracket 11 may be made of an aluminum alloy to improve the structural strength. The sliding member 22 may be machined from a SUS stainless steel plate and a POM plastic by the insert-molding process. The stainless steel plate may serve as a body to play the role of strength support. The sliding groove may be made of the POM plastic by injection molding and may slide relative to the fixed base 21 and the guide rail 24 to reduce friction. The limit stopper 25 may be made of a plastic material and may limit the initial position of the sliding member 22 and also prevent the sliding member 22 from separating from the guide rail 24. The guide rail 24 may be machined from stainless steel by a stamping process and fixed to the fixed base 21 by spot welding. The guide rail 24 cooperates with the sliding groove 220 in the sliding member 22 to form an inverted hook structure to prevent the sliding member 22 from moving away from the guide rail 24 when sliding. An exposed surface of the sliding member 22 may serve as an adhesive area 226 to be adhered and fixed to the flexible display screen 90.

Referring to FIG. 1 again, an embodiment of the present disclosure provides a retractable screen structure, including the sliding rail mechanism 1 and the flexible display screen 90 described in the above embodiments. A side of the bracket 11 away from the sliding rail assembly 20 is provided with a rotating shaft assembly 12, and an axial direction of the rotating shaft assembly 12 is perpendicular to the first direction X. A first end of the flexible display screen 90 is connected to the sliding member 22, and a second end of the flexible display screen 90 is wound around the rotating shaft assembly 12.

Through the above arrangement, the sliding member 22 moves along the first direction X relative to the fixed base 21, and then can drive the flexible display screen 90 to move together, thereby achieving the expanding and retracting of the flexible display screen 90. The sliding member 22 drives the elastic assembly 23 to move together to stretch the elastic assembly 23, thereby generating a pre-tension on the flexible display screen 90. Thus, the flexible display screen 90 becomes much flatter when expanded, thereby preventing visual problems such as bulging, swelling and distortion of the screen when the whole device is slid open.

In some possible implementations, the rotating shaft assembly 12 includes a rotating shaft support 121, a rotating shaft 122, and a rotating wheel 123. The rotating shaft support 121 is provided at a side of the bracket 11 away from the sliding rail assembly 20. The rotating shaft 122 passes through the rotating shaft support 121. The rotating wheel 123 is fitted over the rotating shaft 122, and the second end of the flexible display screen 90 is wound around the rotating wheel 123. When the flexible display screen 90 moves with the sliding member 22, the rotating wheel is rotated passively such that the flexible display screen 90 is expanded and retracted more smoothly In the present embodiment, the flexible display screen 90 is formed by bonding a flexible OLED screen and a layer of extremely thin stainless steel mesh together and has great flexibility. There may be a plurality of rotating shaft supports 121 provided at intervals in a second direction perpendicular to the first direction X. There may be a plurality of rotating wheels 123, one rotating wheel is mounted between two adjacent rotating shaft supports 121, and the rotating wheels may be divided into large rotating wheels and small rotating wheels according to sizes between two adjacent rotating shaft supports 121, and mounted at suitable positions. The rotating wheel may be made of the engineering plastic POM by injection molding and defines a through hole in the middle and grooves at two ends to place the bearings 124. The rotating wheel is fitted over the rotating shaft 122, and may be rotated passively on the rotating shaft 122 by the bearing 124 after assembly. The rotating shaft 122 may be a D-shaped shaft with a D-shaped cross section, and the D-shaped cross section is mainly configured to fix the inner bearing ring, thereby preventing the inner bearing ring from rotating relative to the rotating shaft. The rotating shaft may be made of stainless steel, and pass through the plurality of rotating shaft supports 121. Threads 1220 may be formed at two ends of the rotating shaft 122, and the rotating shaft 122 may be fixed on a middle frame of the electronic device 100 by fasteners such as screws 126, thereby fixing the rotating shaft. The screw 126 may be made of metal material. The screw may include a dual screw with a screw rod at an end, and the screw passes through a screw gasket and is locked on the rotating shaft to tightly lock the screw gasket and the rotating shaft together. The material of the bearing 124 may be stainless steel or ceramic, and mounted on the rotating wheel 123. Two ends of each rotating wheel 123 are each mounted with one bearing 124 and also mounted with a bearing shim. The bearing shim may be made of metal material. During mounting of the rotating wheels on the rotating shaft, each of two sides of each rotating wheel is placed with one bearing shim, and the rotating shaft passes through inner holes of the bearing shims. After the two ends of the rotating shaft are locked by the screws, the screw gasket functions to fix an inner bearing ring to prevent the inner bearing ring from rotating with an outer bearing ring, and further functions to ground the bearings and the bracket.

Figure 10:
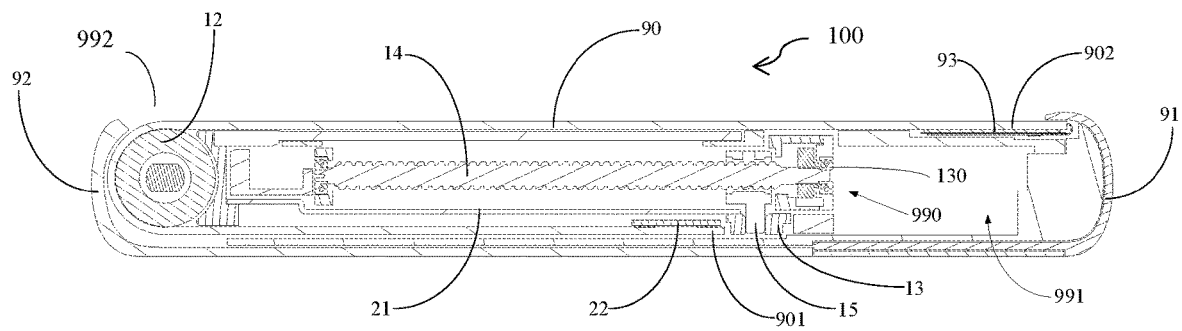
FIGS. 10 and 11 are schematic views of an electronic device according to an embodiment of the present disclosure when a flexible display screen is in a retracted state and an expanded state, respectively.
Figure 11:
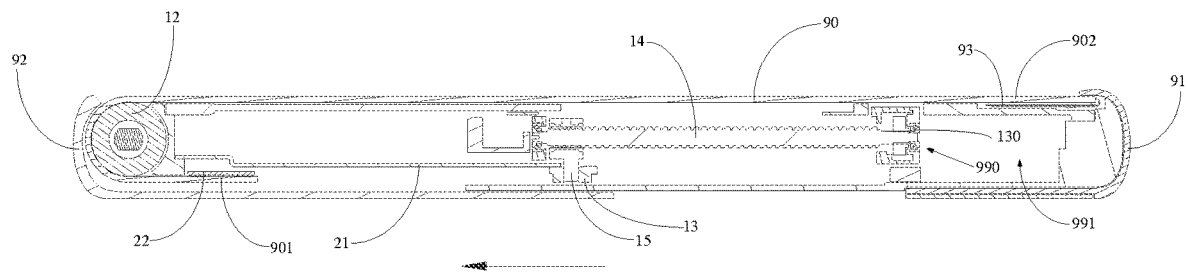
Figure 12:
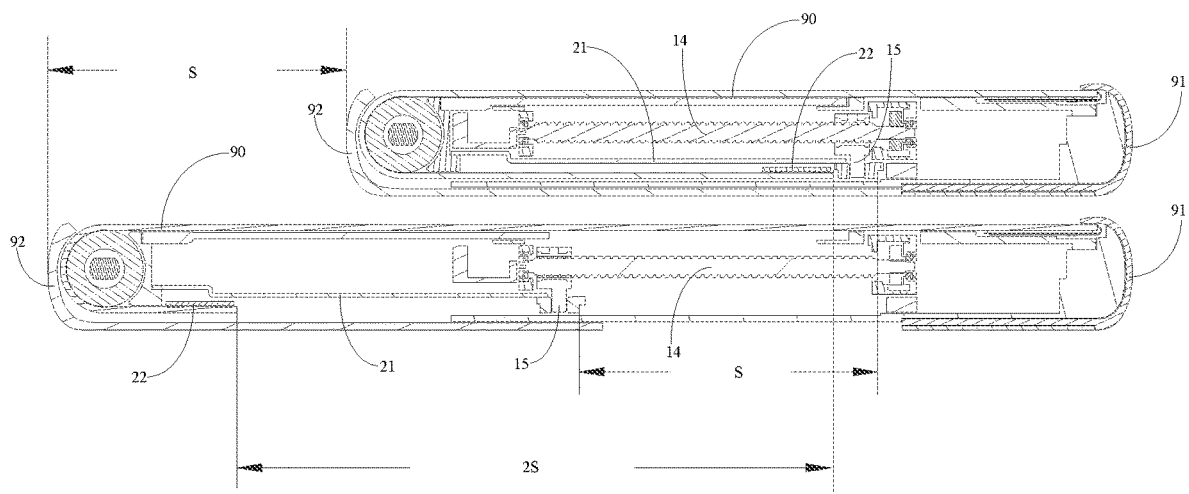
FIG. 12 shows comparison views of an electronic device of an embodiment of the present disclosure when a flexible display screen is in a retracted state and an expanded state, respectively.

Referring to FIGS. 10 to 12, an embodiment of the present disclosure provides an electronic device 100, which may be a mobile phone, a mobile terminal, a tablet computer, a laptop, a handheld terminal device with a screen, a vehicle-mounted display device, and the like. The electronic device 100 includes a housing, a retractable screen structure as described in the above embodiments, and a driving mechanism 99.

The housing includes a first housing 91 and a second housing 92 slidably provided on the first housing 91 along the first direction X, the first housing 91 and the second housing 92 are enclosed to form a receiving structure 991 with an opening 992. Both the flexible display screen 90 and the sliding rail mechanism 1 are provided in the receiving structure 991, and the sliding rail mechanism 1 is connected to the second housing 92. The rotating shaft assembly 12 is located on a side close to the second housing 92, a first end 901 of the flexible display screen 90 is located at a side close to a bottom of the housing, and a second end 902 of the flexible display screen 90 is connected to the first housing 91 to cover the opening 992. The driving mechanism 99 is provided in the receiving structure 991 and connected to the first housing 91. The driving mechanism 99 is connected to the sliding rail mechanism 1 and configured to drive the sliding rail mechanism 1 to move along the first direction X. In at least one embodiment, the first housing 91 may be provided with a support plate 93, the second end of the flexible display screen 90 is connected to the support plate 93, and the support plate 93 may support and protect the flexible display screen 90.

The driving mechanism 99 drives the sliding rail mechanism 1 to move along the first direction X, to drive the second housing 92, the sliding rail assembly 20, the first end of the flexible display screen 90, and the sliding member 22 to move along the first direction X relative to the first housing 91, such that the flexible display screen 90 is switched between the expanded state and the retracted state.

Referring to FIG. 10, due to the pre-tension of the elastic member of the elastic assembly, the sliding member 22 is pre-tensioned by the elastic assembly at the initial position, and due to the existence of the limit stopper 25, the sliding member 22 is kept in a static state at the initial position and the flexible display screen 90 is in a retracted state.

The driving mechanism 99 is fixed to the middle frame (i.e., the housing) of the whole device as a power source. After receiving an instruction through UI, the electronic device 100 controls the driving mechanism 99 to drive the sliding rail mechanism 1 to move along the first direction X (to the left as illustrated in FIG. 11), such that the whole sliding rail mechanism 1 slides out relative to the first housing 91 in a direction away from the first housing 91. During this process, the first end of the flexible display screen 90 slides with the sliding member 22, and the rotating wheel of the rotating shaft assembly is passively rotated under the force of the flexible display screen 90. Since the second end of the flexible display screen 90 is connected to the first housing 91, as the sliding rail mechanism 1 gradually slides out, an effect of gradually expanding the flexible display screen 90 may be achieved, as illustrated in FIG. 11. During the sliding process of the sliding rail mechanism 1, the sliding member 22 may be pulled by the flexible display screen to move from one end of the fixed base 21 to the other end, which may further increase the expanding length of the flexible display screen 90. In addition, during the sliding process, the elastic assembly is stretched by the sliding member 22 to generate an elastic tension to the sliding member 22 in a direction opposite to the sliding direction. The flexible display screen 90 is constantly subjected to the tension in the opposite direction, which is equivalent to pulling the flexible display screen 90 to the right, such that the stretched flexible display screen 90 becomes flatter. In this way, it may be ensured that the flexible display screen 90 may move along a curving track according to the design intent, thereby preventing the visual problems such as bulging, swelling and distortion of the screen when the whole device is slid open.

It may be understood that during the whole process, the sliding member 22 is pulled by the second end of the flexible display screen 90 to move from one end of the fixing base 21 to the other end. Assuming that the sliding stroke of the sliding rail mechanism 1 relative to the first housing 91 is S and the sliding stroke of the sliding member 22 is S, the first end of the flexible display screen 90 moves a distance of 2S with the sliding rail mechanism 1 relative to the first housing 91.

When the whole device receives an external instruction to retract, a driving motor 16 starts to drive in a reverse direction to retract the sliding rail mechanism 1 and the flexible display screen. During this process, the bracket and the fixed base are driven by the driving mechanism 99 to move in the reverse direction. The flexible display screen and the sliding member are gradually retracted under the elastic force of the elastic assembly, and the sliding member returns to the initial position under the elastic force of the elastic assembly, thereby restoring the flexible display screen to the retracted state. Therefore, the sliding rail mechanism 1 of the present disclosure may smoothly and effectively ensure that the flexible display screen maintains the curved shape in appearance during the sliding-open and retracting process of the whole device, and ensure that the power loss caused by the friction generated during the sliding-open and retracting process of the screen is at a relatively low level. The solution is operable and easy to implement and the product reliability may be ensured.

Referring to FIGS. 10 and 11, in some possible implementations, the bracket 11 is provided with a transmission member 13. The driving mechanism 99 includes a driving motor 16, a screw rod 14 connected with the driving motor 16, and a nut 15 fitted over the screw rod 14. The screw rod 14 is arranged to extend along the first direction X, and the nut 15 abuts against the transmission member 13. The driving motor 16 drives to the screw rod 14 to rotate, and then drives the nut 15 and the transmission member 13 to move along the first direction X, thereby driving the sliding rail mechanism 1 to move along the first direction X. It should be noted that the driving mechanism 99 may also adopt structures such as gear racks, worm gears, and the like, which is not limited in the present disclosure.

Figure 13:
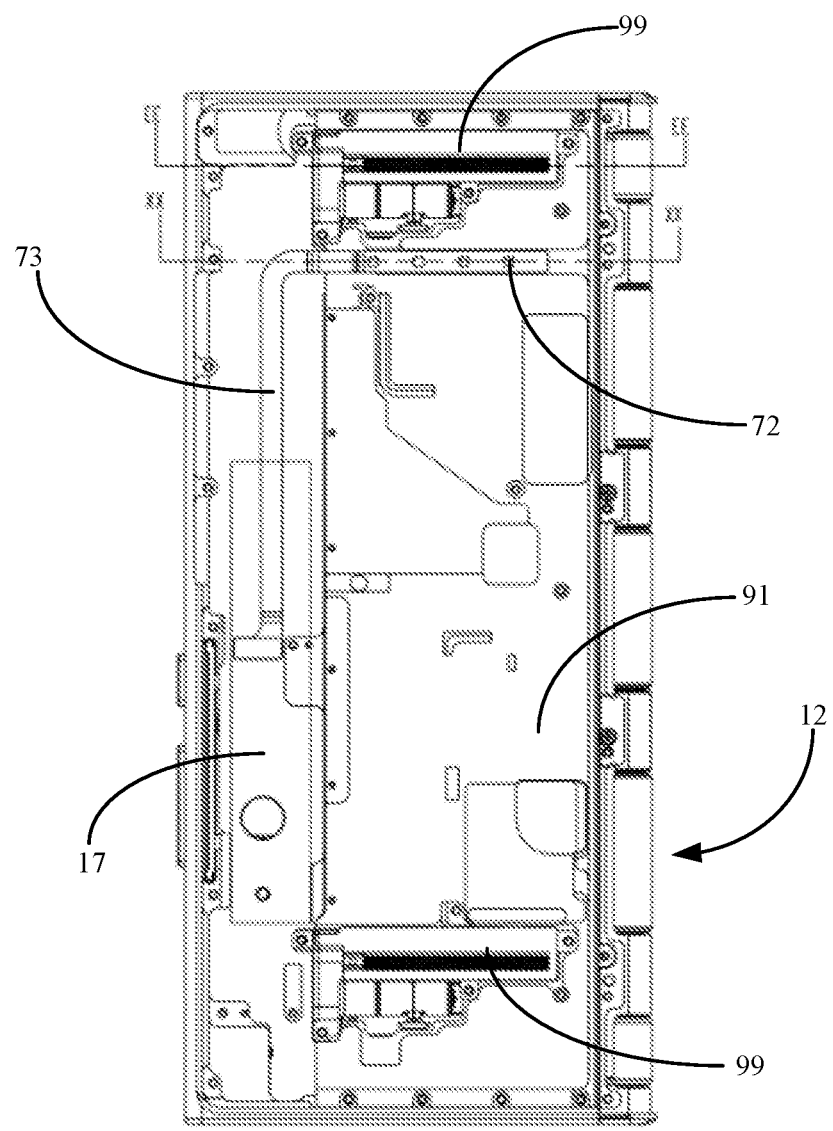
FIG. 13 is an assembly view of a displacement sensor of an electronic device according to an embodiment of the present disclosure.
Figure 14:
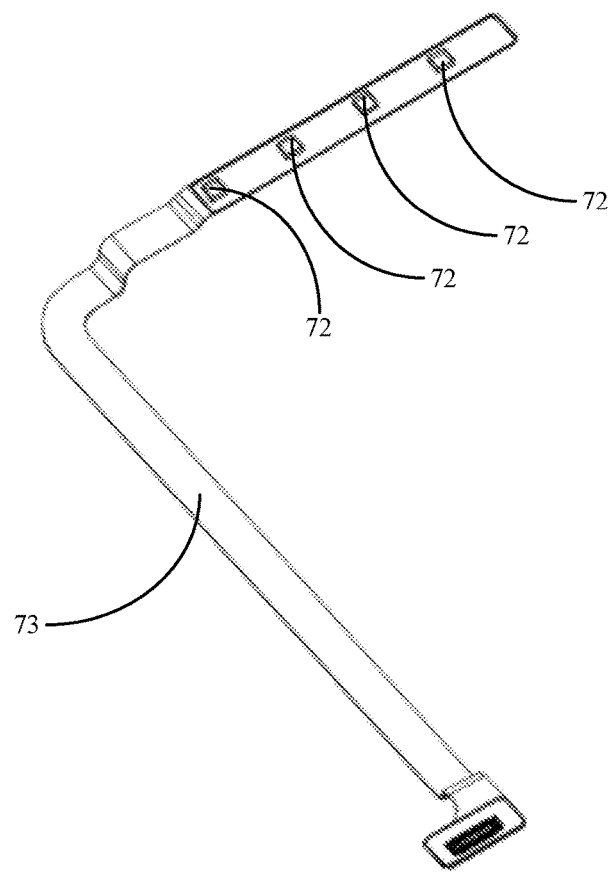
FIG. 14 is a perspective view of a displacement sensor of an electronic device according to an embodiment of the present disclosure.
Figure 15:
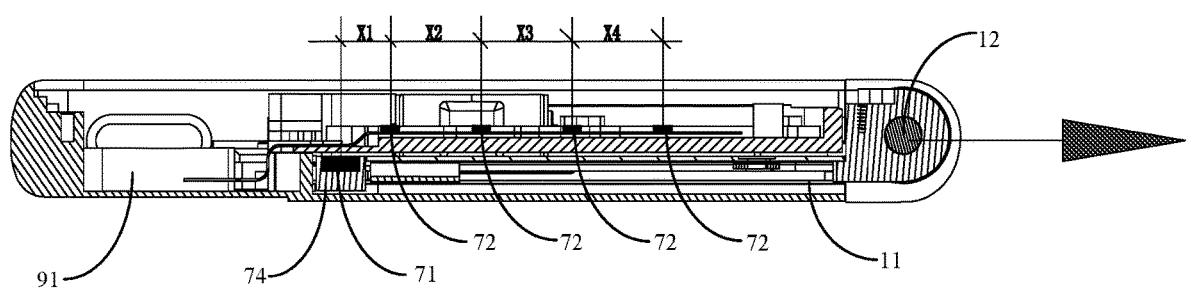
FIG. 15 is a sectional view of FIG. 13 along plane XX-XX.
Figure 16:
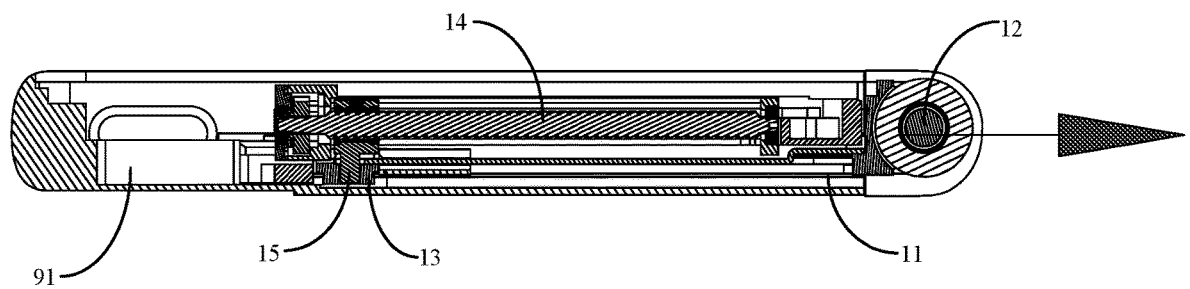
FIG. 16 is a sectional view of FIG. 13 along plane EE-EE.
Figure 17:
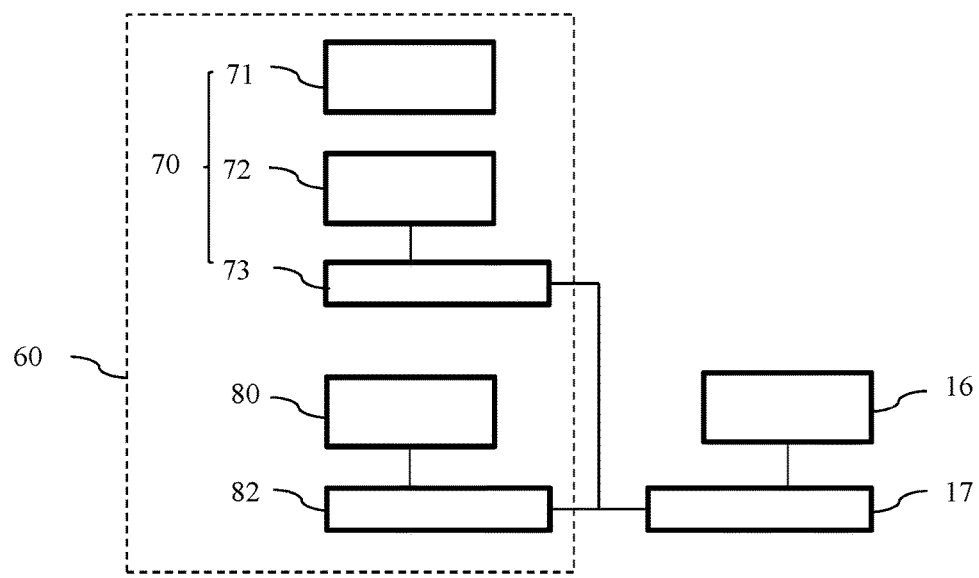
FIG. 17 is a schematic block diagram of a control mechanism and a driving mechanism according to an embodiment of the present disclosure.

Referring to FIGS. 13 and 17, in some alternative implementations, the electronic device 100 of the present disclosure may further include a control mechanism 60, the control mechanism 60 includes a displacement sensor 70 and a controller 80 electrically connected to the displacement sensor 70, and the displacement sensor 70 is configured to measure displacement change of the sliding rail mechanism 1 relative to the first housing 91. The controller 80 is provided at the first housing 91 and configured to control a first stroke amount that the sliding rail mechanism 1 moves along the first direction X under the drive of the driving mechanism 99 according to the displacement change. The driving mechanism 99 drives the sliding rail mechanism 1 to move along the first direction X, to drive the bracket 11, the second housing 92 and the first end 901 of the flexible display screen 90 to move along the first direction X relative to the first housing 91, such that the flexible display screen 90 is switched between the expanded state and the retracted state. It may be understood that the displacement sensor 70 is configured to measure the displacement change of the bracket 11 of the sliding rail mechanism 1 relative to the first housing 91, and the driving mechanism 99 drives the bracket 11 of the sliding rail mechanism 1 to move along the first direction X, to drive the bracket 11, the second housing 92, and the first end 901 of the flexible display screen 90 to move along the first direction X relative to the first housing 91. In the present embodiment, two driving mechanisms 99 are provided and symmetrically arranged on the first housing 91. The bracket is pushed by nuts of the two driving mechanisms to move outward or retract relative to the first housing, and the dual driving mechanism is adopted to ensure the balance of the pushing force.

Based on the above arrangement, the displacement change of the sliding rail mechanism 1 relative to the first housing 91 is measured by the displacement sensor 70, the controller 80 may determine the first stroke amount that the sliding rail mechanism 1 needs to move along the first direction X according to the displacement change, and output a control signal to the driving mechanism. Then, the driving mechanism drives the sliding rail mechanism 1 to move along the first direction X according to the control signal, to drive the flexible display screen 90 to move, thus achieving the purpose of accurately controlling the movement stroke of the flexible display screen 90.

In some possible implementations, the displacement sensor 70 includes a Hall magnet 71 and a plurality of Hall sensors 72 electrically connected to the controller 80. The Hall magnet 71 is provided at one of the sliding rail mechanism 1 and the first housing 91, and the plurality of Hall sensors 72 are provided at the other of the sliding rail mechanism 1 and the first housing 91. In the example illustrated in FIG. 13, the Hall magnet 71 is provided at the sliding rail mechanism 1, and the plurality of Hall sensors 72 are provided at the first housing 91. The sliding rail mechanism 1 moves relative to the first housing 91, and the plurality of Hall sensors 72 obtain the displacement change of the sliding rail mechanism 1 relative to the first housing 91 by sensing a magnetic field change of the Hall magnet 71. In at least one embodiment, the Hall magnet 71 is provided on the bracket 11 of the sliding rail mechanism 1.

It may understood that the Hall sensor 72 may be a Hall chip. Control principle of the controller 80 is as follows: the Hall chips and the Hall magnet cooperate with each other, the Hall magnet is fixed to the bracket 11 of the sliding rail mechanism 1 that is in motion, the Hall magnet generates a magnetic field change, and the Hall chips sense a magnetic field of a different intensity to generate an electrical signal change and send the electrical signal change to the controller 80, the controller 80 determines the displacement change of the bracket of the sliding rail mechanism 1 relative to the first housing according to the electrical signal change (i.e., the stroke amount that the bracket of the sliding rail mechanism 1 has moved relative to the first housing), and then calculates a first stroke amount that the bracket of the sliding rail mechanism 1 still needs to move relative to the first housing, to control the driving mechanism to drive the bracket to move the first stroke amount, thus achieving the purpose of accurately controlling the movement stroke of the flexible display screen.

Referring to FIGS. 13 to 16, in some possible implementations, the Hall magnet 71 is provided to the sliding rail mechanism 1, and the plurality of Hall sensors 72 are provided at the first housing 91 and spaced apart from each other along the first direction X. In the present embodiment, the Hall magnet 71 is provided at the bracket 11 of the sliding rail mechanism 1. Four Hall sensors 72 are provided, and distances of the four Hall sensors 72 along the first direction X (i.e. the direction illustrated by the arrow in FIG. 15) is X1, X2, X3 and X4, respectively. Different distances are also maintained between the hall magnet 71 and the four Hall sensors 72, respectively, and need to meet the sensing range of the Hall sensors. By providing the plurality of Hall sensors to jointly sense the magnetic field changes of the Hall magnet, the displacement change of the bracket relative to the first housing may be calculated more accurately, to achieve the purpose of accurately controlling the movement stroke of the flexible display screen.

In some possible implementations, the displacement sensor 70 further includes a sensor circuit board 73 provided to the first housing 91, and the plurality of Hall sensors 72 are provided at the sensor circuit board 73 and spaced apart from each other along the first direction X. The driving mechanism includes a driving circuit board 17 electrically connected to the sensor circuit board 73. The controller 80 includes a control circuit board 82 electrically connected to the driving circuit board 17. In at least one embodiment, the sensor circuit board 73 may be a FPC board, which reduces the occupied space. The control circuit board 82 is electrically connected to the sensor circuit board 73 and configured to receive data measured by the sensor circuit board 73. The control circuit board 82 is electrically connected to the driving circuit board and configured to send a control signal to the driving circuit board.

It may be understood that the driving circuit board 17 is fixed on the first housing 91 of the middle frame housing, and the Hall chips may be attached to the sensor circuit board 73. The sensor circuit board 73 is connected and fixed to the driving circuit board 17 by a connector, and the sensor circuit board 73 is fixed to the first housing 91, i.e., a bracket of the middle frame. The driving circuit board 17 is connected to the control circuit board 82 through a FPC board. The Hall magnet 71 is fixed to the bracket 11 by gluing. The bracket 11 may define a receiving groove 74 in which the Hall magnet 71 is embedded to ensure the stability of the Hall magnet 71. When the driving mechanism drives the bracket 11 to move, the Hall magnet 71 also moves with it, to generate a varying distance from the Hall chip.

The bracket 11 of the sliding rail mechanism 1 is fixedly connected to the nut 15 of the driving mechanism. When the driving mechanism drives the bracket 11 to slide, a varying distance relative to the Hall chips is generated, the Hall magnet provided on the bracket 11 of the sliding rail mechanism 1 also moves with the bracket 11 to generate a varying distance. N/S poles of the Hall magnet form a closed-loop magnetic field. When the sliding rail mechanism 1 is in a closed state, the Hall chips are within this magnetic field and enabled to generate a signal, and the signal may locate a position signal as the sliding rail mechanism 1 is closed in place. When the Hall magnet moves outward with the bracket, the magnetic field of the Hall magnet changes, the Hall chip determines the distance that the bracket is pushed out based on the magnetic field change, generates an electrical signal and transmits the electrical signal to the controller 80 (which may be understood as a terminal product CPU), the controller 80 sends a control signal to the driving circuit board according to the signal, and drives the driving motor 16 to rotate or stop. In this way, the stroke of the nut relative to a screw rod is controlled and the sliding stroke of the bracket is controlled accordingly, thus achieving the purpose of accurately controlling the movement stroke of the flexible display screen.

In some possible implementations, the controller 80 is further electrically connected to the flexible display screen 90, and is further configured to determine a second stroke amount that the flexible display screen 90 is expanded or retracted according to the first stroke amount that the sliding rail mechanism 1 moves along the first direction X, and to control display size of the flexible display screen 90 according to the second stroke amount. It may be understood that by receiving and sensing the signal change of the Hall chips, the controller 80 controls the display size of the flexible display screen 90 according to the first stroke amount that the sliding rail mechanism 1 moves along the first direction X and the second stroke amount, to control display change of the flexible display screen 90. Thus, the function that the screen displays while sliding may be achieved, and a screen display ratio of any stroke may also be controlled, thus ensuring the display performance of the screen.

Other embodiments of the disclosure will be apparent to those skilled in the art from consideration of the specification and practice of the present application disclosed here. The present disclosure is intended to cover any variations, uses, or adaptations of the disclosure following the general principles thereof and including common knowledge or conventional means in the art that are not disclosed in the present disclosure. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An electronic device, comprising:
a first housing and a second housing enclosed to form a receiving structure with an opening;
a sliding rail mechanism provided in the receiving structure and connected to the second housing, the sliding rail mechanism being slidably provided to the first housing along a first direction;
a flexible display screen having a first end connected with the sliding rail mechanism and a second end connected with the first housing to cover the opening;
a driving mechanism provided in the receiving structure and connected to the first housing, the driving mechanism being connected to the sliding rail mechanism and configured to drive the sliding rail mechanism to move along the first direction; and
a control mechanism comprising a displacement sensor and a controller electrically connected to the displacement sensor, the displacement sensor being configured to measure displacement change of the sliding rail mechanism relative to the first housing; the controller being provided at the first housing and configured to control a first stroke amount that the sliding rail mechanism moves along the first direction under drive of the driving mechanism according to the displacement change,
wherein the driving mechanism drives the sliding rail mechanism to move along the first direction, to drive the second housing and the first end of the flexible display screen to move along the first direction relative to the first housing, such that the flexible display screen is switched between a retracted state and an expanded state, wherein the sliding rail mechanism comprises:
a bracket assembly comprising a bracket;
a sliding rail assembly comprising a fixed base, a sliding member, and an elastic assembly;
the fixed base being fixedly connected to the bracket, the sliding member is slidably provided on the fixed base along the first direction and connected to the first end of the flexible display screen, the elastic assembly having a first end connected to the fixed base and a second end connected to the sliding member,
wherein when the sliding member slides relative to the fixed base along the first direction, the sliding member drives the second end of the elastic assembly and the flexible display screen to move together, and the elastic assembly provides an elastic force towards the first housing on the sliding member; and
wherein the fixed base is provided with a step portion extending along the first direction, and the sliding member is provided with an abutting block abutting against the step portion.

2. The electronic device according to claim 1, wherein the displacement sensor comprises a Hall magnet and a plurality of Hall sensors electrically connected to the controller, the Hall magnet is provided at one of the sliding rail mechanism and the first housing, and the plurality of Hall sensors are provided at the other of the sliding rail mechanism and the first housing; and
the sliding rail mechanism moves relative to the first housing, and the plurality of Hall sensors obtain the displacement change of the sliding rail mechanism relative to the first housing by sensing a magnetic field change of the Hall magnet.

3. The electronic device according to claim 2, wherein the Hall magnet is provided to the sliding rail mechanism, and the plurality of the Hall sensors are provided at the first housing and spaced apart from each other along the first direction.

4. The electronic device according to claim 3, wherein the displacement sensor further comprises a sensor circuit board provided to the first housing, and the plurality of Hall sensors are provided at the sensor circuit board and spaced apart from each other along the first direction;
the driving mechanism comprises a driving circuit board electrically connected to the sensor circuit board; and
the controller comprises a control circuit board electrically connected to the driving circuit board.

5. The electronic device according to claim 1, wherein the controller is further electrically connected to the flexible display screen, and is further configured to determine a second stroke amount that the flexible display screen is expanded or retracted according to the first stroke amount that the sliding rail mechanism moves along the first direction, and to control display size of the flexible display screen according to the second stroke amount.

6. The electronic device according to claim 1, wherein the driving mechanism comprises a driving motor, a screw rod connected with the driving motor, and a nut fitted over the screw rod; the driving motor is provided to the first housing and electrically connected to the controller, the screw rod is arranged to extend along the first direction, and the nut abuts against the sliding rail mechanism; and
the driving motor drives to the screw rod to rotate, and the nut moves along the first direction relative to the screw rod, to drive the sliding rail mechanism to move along the first direction relative to the first housing.

7. The electronic device according to claim 6, wherein two driving mechanisms are provided and symmetrically arranged on the first housing.

8. The electronic device according to claim 1, wherein the elastic assembly comprises a first rod, a second rod, and an elastic member, the first rod and the second rod are inserted into each other, the elastic member is connected between the first rod and the second rod, the first rod is connected to the fixed base, and the second rod is connected to the sliding member; and
when the sliding member slides relative to the fixed base, the sliding member drives the second rod to slide relative to the first rod and cooperates with the first rod to stretch or compress the elastic member.

9. The electronic device according to claim 8, wherein a plurality of the elastic assemblies are provided and comprise a first elastic assembly, a second elastic assembly, and a third elastic assembly; the second elastic assembly and the third elastic assembly are symmetrically provided at two sides of the first elastic assembly; and
the elastic member of the first elastic assembly extends along the first direction, the elastic members of the second elastic assembly and the third elastic assembly are symmetrically provided along the first direction and inclined with respect to the first direction.

10. The electronic device according to claim 8, wherein a first end of the first rod is fixed to the fixed base by a rivet, and a first end of the second rod is fixed to the sliding member by a rivet; a second end of the first rod protrudes outward to form a first protrusion, and a second end of the second rod protrudes outward to form a second protrusion; and a plurality of elastic members are provided and evenly arranged between the first protrusion and the second protrusion.

11. The electronic device according to claim 1, wherein the sliding rail assembly further comprises at least one guide rail provided on the fixed base and extending along the first direction, the sliding member defines a sliding groove corresponding to the guide rail, and the sliding member is slidably provided on the guide rail through the sliding groove.

12. The electronic device according to claim 11, wherein at least one side of the guide rail is provided with an engagement portion, the sliding member is provided with a first snap portion, and the sliding member is snapped with the engagement portion of the guide rail through the first snap portion.

13. The electronic device according to claim 1, wherein the sliding rail assembly further comprises at least one limit stopper provided at an end of the fixed base away from the bracket, the sliding member is provided with a limit portion, and the limit stopper abuts against and cooperates with the limit portion to limit an initial position of the sliding member.

14. The electronic device according to claim 1, wherein a side of the sliding member is provided with a first snap portion snapped with a side edge of the fixed base.

15. The electronic device according to claim 14, wherein the sliding rail assembly further comprises a plastic snap covering and snapped with the side edge of the fixed base, and the first snap portion is snapped to the plastic snap.

16. The electronic device according to claim 1, wherein an end of the bracket is provided with a connecting plate, and the fixed base is fixed to the connecting plate through a riveting process.

17. The electronic device according to claim 1, wherein a side of the bracket away from the sliding rail assembly is provided with a rotating shaft assembly, an axial direction of the rotating shaft assembly is perpendicular to the first direction, and the first end of the flexible display screen is connected to the sliding member and the second end of the flexible display screen is wound around the rotating shaft assembly.

18. The electronic device according to claim 17, wherein the rotating shaft assembly comprises a rotating shaft support, a rotating shaft, and a rotating wheel, the rotating shaft support is provided at the side of the bracket away from the sliding rail assembly, the rotating shaft passes through the rotating shaft support, the rotating wheel is fitted over the rotating shaft, and the second end of the flexible display screen is wound around the rotating wheel.

* * * * *